United States Patent

Tharp

[11] Patent Number: 5,979,360
[45] Date of Patent: Nov. 9, 1999

[54] ANT FREE DOG BOWL

[76] Inventor: Danial Tharp, 2054 Cohn Rd., North Fort Myers, Fla. 33917

[21] Appl. No.: 08/916,521

[22] Filed: Aug. 22, 1997

Related U.S. Application Data

[60] Provisional application No. 60/048,203, Jun. 2, 1997.
[51] Int. Cl.[6] ................................................ A01K 5/01
[52] U.S. Cl. ................................................ 119/51.5; 119/61
[58] Field of Search ........................................ 119/51.5, 61

[56] References Cited

U.S. PATENT DOCUMENTS

D. 105,812  8/1937  Siekert ................................. 119/61 X
D. 326,742  6/1992  Tart ..................................... 119/61 X
4,886,016  12/1989  Atchley ................................. 119/61

*Primary Examiner*—Robert P. Swiatek
*Attorney, Agent, or Firm*—Frank A. Lukasik

[57] ABSTRACT

An ant free pet food bowl comprising an outer wall forming the outer periphery of a first depression for holding water and an inner wall forming the outer periphery of a second depression for holding pet food, the space between the outer and inner walls forming the depressions. The outer wall has a wide base to prevent tipping by the pet.

2 Claims, 2 Drawing Sheets

ANT FREE DOG BOWL

RELATED INVENTION

This application claims the benefit of U.S. Provisional Application Ser. No. 60/048,203, Filed Jun. 02, 1997.

BACKGROUND OF THE INVENTION

1. Field of the Invention

This invention relates generally to food bowls for animals and more particularly to a pet food bowl that will protect the pet food from invasion by ants.

2. Background of the Invention

With the current state of the art pet dishes, the dish is formed bowl shaped, and generally with a single compartment in the bowl for the pet food. For pets which are kept outdoors the pet food bowl is usually placed down on soil either in the back yard or in a kennel. If the food is not consumed at one time, it is vulnerable to insects and particularly, fire ants. Fire ants are stinging ants, any of fiercely stinging, omnivorous ants constituting a genus (Solenopsis) nearly cosmopolitan in warm regions. Fire ants are especially hazardous because of their toxic venom which stings at first and then becomes an ulcerated boil. Humans as well as animals may have serious allergy problems caused by the stings. A significant number of stings may even result in death.

SUMMARY OF THE INVENTION

The invention is specially designed, to prevent ants from reaching the pet food. It has been found that ants cannot swim and that water is an excellent barrier to their constant search for food. The ant free bowl of the invention comprises a circular outer wall supported by a wide base to prevent tipping by the pet. An interior wall separates the outer wall from the inner food bowl portion. A depression between the outer wall and the inner wall is filled with water and the inner bowl is used to hold the pet food which will not be accessible to ants, since ants cannot swim. The ant free bowl of the invention may be made of plastic, either injection molded, or vacuum formed, or other state of the art manufacturing practices.

DESCRIPTION OF THE PREFERRED EMBODIMENT

Figure 1:
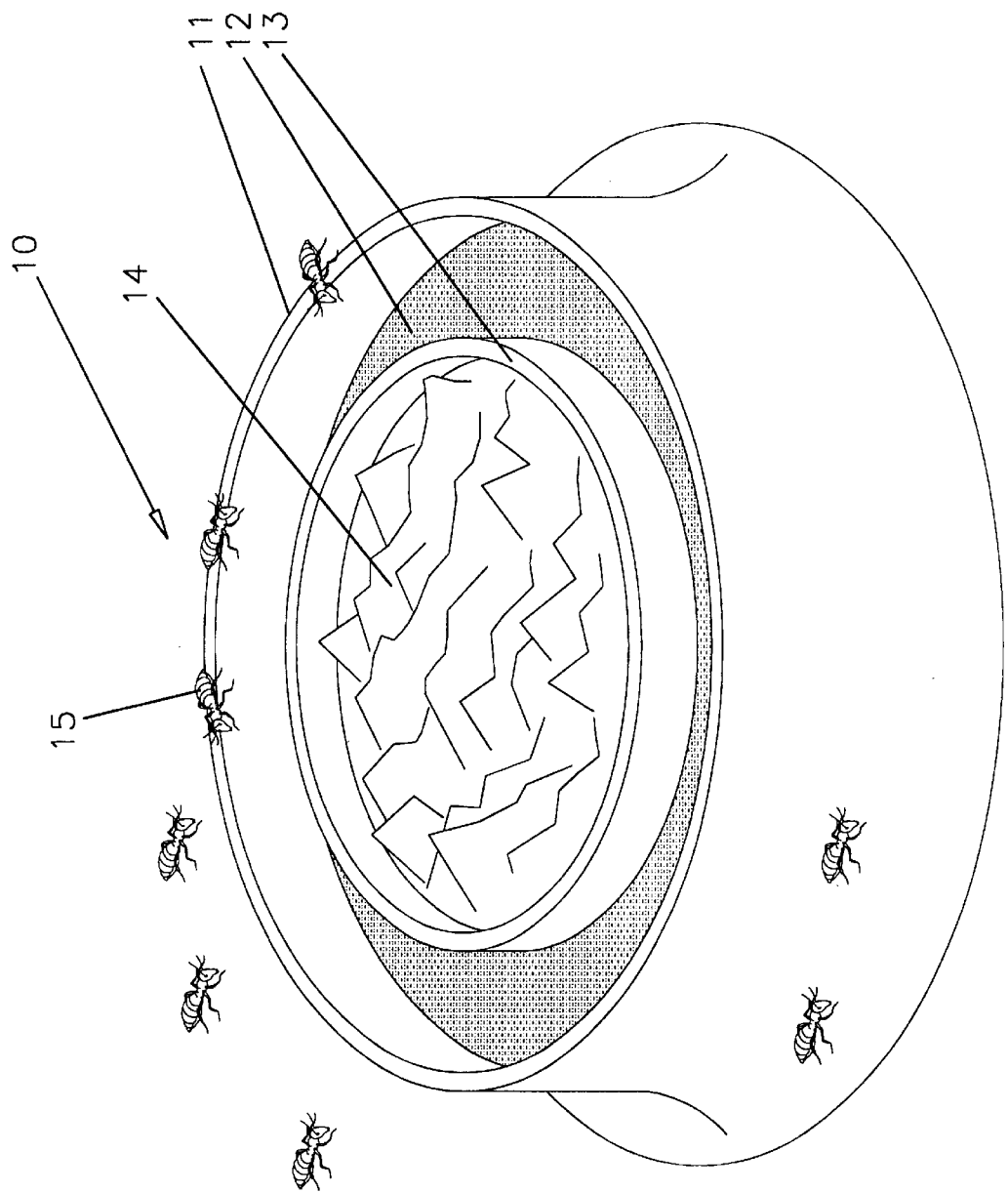
FIG. 1 is a top, front, perspective view of an ant free bowl in accordance with the invention.
Figure 3:
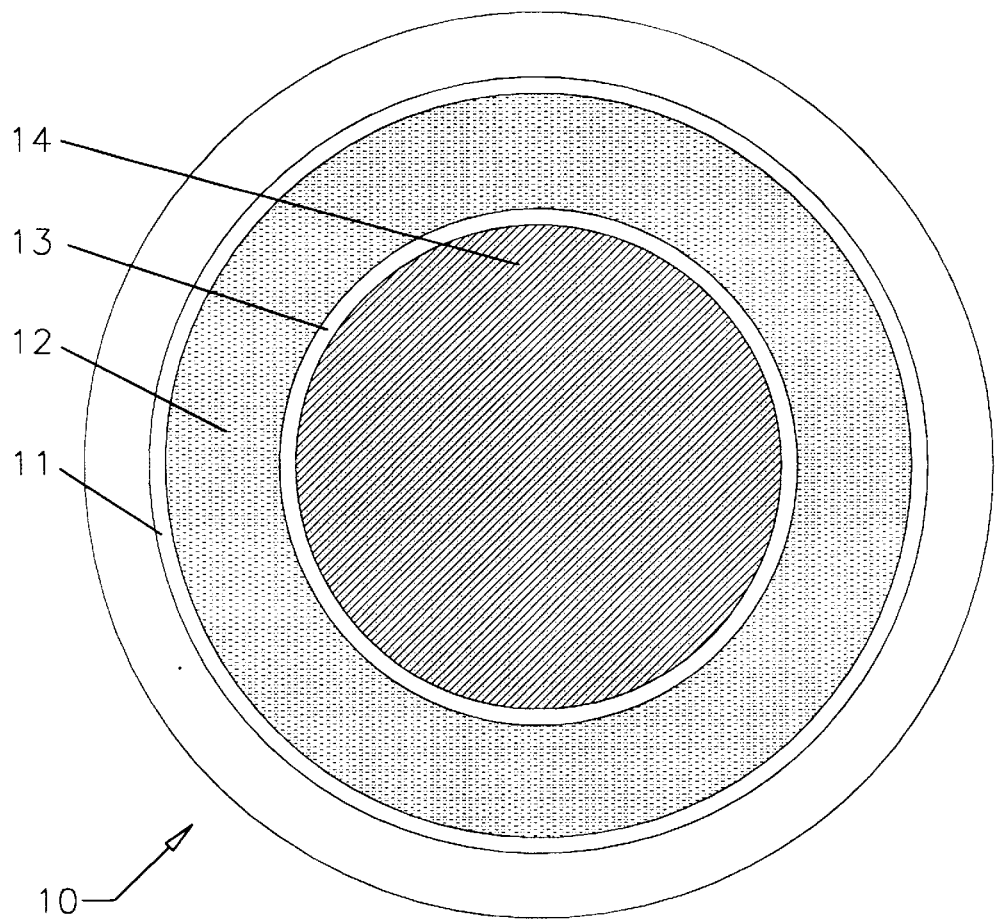
FIG. 3 is a top plan view of an ant free bowl in accordance with the invention.
Figure 2:
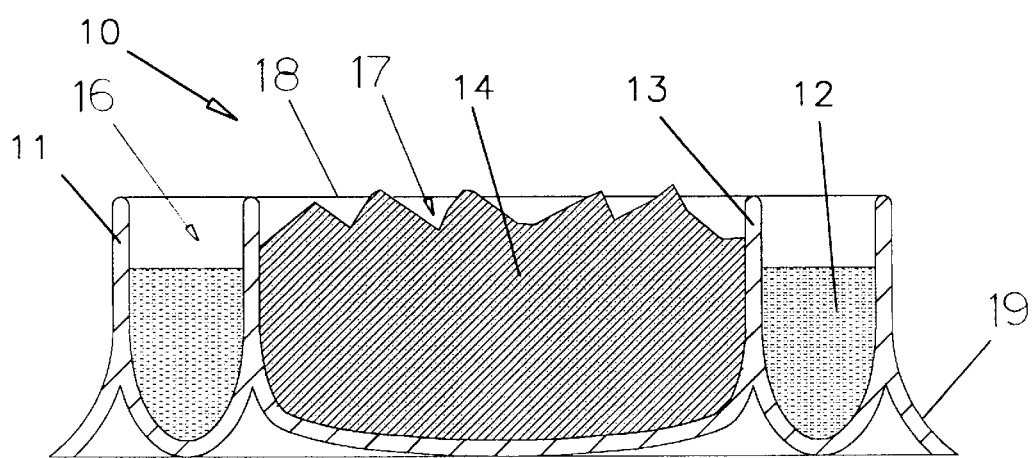
FIG. 2 is a side sectional view of an ant free bowl in accordance with the invention.

Referring to FIG. 1, there is shown the ant free bowl of the invention denoted generally by the numeral 10. The ant free bowl 10 is shown in perspective in FIG. 1. The bowl 10 comprises a circular outer wall 11, a first, outer, circular depression 16, an inner wall 13, and a second inner depression 17. The outer wall 11, forms the outer periphery of a reservoir of water 12, (depression 16) along with the inner wall 13. The inner wall 13 forms the outer periphery of the inner depression 17 which is the receptacle for holding the pet food 14. The depressions 16 and 17 have a depth from the top rim 18 to the base 19. Base 19 has a larger diameter than the outer wall 11 to provide a wider base for the bowl 10 to prevent tipping by a pet.

The ant free bowl 10 may be fabricated in several sizes and the size would be largely determined by the size of the pet and the amount of food consumed at each feeding. In a preferred embodiment, the diameter of the outer wall 11 was 14", the outer diameter of the inner wall 13 was 8" and the depth of the bowl 10 was 4".

When using the ant free bowl 10 of the invention to feed a dog or other animal, the depression 17 is filled with pet food 14, and depression 16 is filled with water 12. The ants 15 may climb up the circular outer wall 11, however the vertical inner surface of outer wall 11, along with the water 12, form a formidable barrier to the ant 15 which cannot swim.

While the invention has been explained with respect to referred embodiment thereof, it is contemplated that various changes may be made in the invention without departing from the spirit and scope thereof.

What is claimed is:

1. A combination of a dog bowl and water for providing an ant free dog bowl, said combination consisting of;

an outer wall forming the outer periphery of a first depressions, said depression being filled with water, said outer wall having a top rim and a base, said base having a larger diameter than said outer wall for providing a wider base to prevent tipping, said base secured to said outer wall adjacent a lower level of said depression, an inner wall forming the outer periphery of a second depression for filling with pet food, said inner wall having a top rim and a base and forming the inner periphery of said first depression, and each of said first and second depressions having a depth reaching from said top rims to the level of said bases said top rims of said outer and inner walls being substantially coplanar.

2. An ant free pet food bowl of claim 1 wherein said outer wall diameter is in the range between eight inches and fourteen inches, said outer depression is in the range between two inches and three inches wide, and the diameter of said second depression is in a range between four inches and eight inches.

* * * * *